(12) United States Patent
Fahringer et al.

(10) Patent No.: US 11,115,573 B2
(45) Date of Patent: Sep. 7, 2021

(54) HYPERSPECTRAL PLENOPTIC CAMERA

(71) Applicants: UNITED STATES OF AMERICA AS REPRESENTED BY THE ADMINISTRATOR OF NASA, Washington, DC (US); AUBURN UNIVERSITY, Auburn University, AL (US)

(72) Inventors: Timothy W. Fahringer, Hampton, VA (US); William Hutchins, Newport News, VA (US); Paul M. Danehy, Newport News, VA (US); Brian S. Thurow, Auburn, AL (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 43 days.

(21) Appl. No.: 16/413,231

(22) Filed: May 15, 2019

(65) Prior Publication Data
US 2019/0273850 A1     Sep. 5, 2019

Related U.S. Application Data

(63) Continuation-in-part of application No. 15/634,533, filed on Jun. 27, 2017, now Pat. No. 10,417,779.
(Continued)

(51) Int. Cl.
*H04N 5/225* (2006.01)
*G02B 27/09* (2006.01)
*G02B 5/20* (2006.01)

(52) U.S. Cl.
CPC ............. *H04N 5/2254* (2013.01); *G02B 5/20* (2013.01); *G02B 27/0961* (2013.01); *H04N 5/2253* (2013.01)

(58) Field of Classification Search
CPC .............. H04N 5/2254; H04N 5/2253; H04N 5/22541; G02B 27/0961; G02B 5/20
See application file for complete search history.

(56) References Cited

U.S. PATENT DOCUMENTS

| | | | |
|---|---|---|---|
| 2015/0116526 A1* | 4/2015 | Meng ................. | H04N 5/23232 348/218.1 |
| 2015/0146082 A1* | 5/2015 | Kim .................... | H04N 5/22541 348/360 |

(Continued)

OTHER PUBLICATIONS

Fahringer et al., "Design of a Multi-Color Plenoptic Camera for Snapshot Hyperspectral Imaging", American Institute at Aeronautics and Astronautics, pp. 1-9.

(Continued)

*Primary Examiner* — Gevell V Selby
(74) *Attorney, Agent, or Firm* — Shawn P. Gorman; Jonathan B. Soike; Helen M. Galus

(57) ABSTRACT

Methods, systems, and apparatuses for a hyperspectral plenoptic camera. A hyperspectral plenoptic camera may be configured with a filter in the aperture plane of the camera. The filter may selectively transmit radiated wavelengths to a microlens array, which may focus and transmit the wavelengths to an image sensor based on, e.g., the location and intensity of the wavelengths. One or more lenses and/or an iris may be configured to collect, focus, and/or transmit wavelengths to and from the filter. The filter may be located between two lenses, and the distance between the two lenses may be based on a diameter of an aperture of the plenoptic camera.

14 Claims, 12 Drawing Sheets

Related U.S. Application Data

(60) Provisional application No. 62/356,129, filed on Jun. 29, 2016.

(56) References Cited

U.S. PATENT DOCUMENTS

| | | | | |
|---|---|---|---|---|
| 2015/0234102 A1* | 8/2015 | Kurzweg | ............... | H04N 5/332 348/360 |
| 2016/0278637 A1* | 9/2016 | Gao | ................... | H04N 5/23245 |

OTHER PUBLICATIONS

Hagen et al., "Review of Snapshot Spectral Imaging Technologies," Optical Engineering, vol. 52, 2013, p. 90901.

Gang et al., "Temperature Profiling of Pulverised Coal Flames Using Multi-Colour Pyrometric and Digital Imaging Techniques," 2005 IEEE Instrumentationand Measurement Technology Conference Proceedings, 2005, pp. 1658-1662, vol. 3.

Adelson et al., "The Pienoptic Function and the Elements of Early Vision," Computational Models of Visual Processing, 1991, pp. 3-20.

Adelson et al., "Single Lens Stereo with a Plenoptic Camera," IEEE Transactions on Pattern Analysis and Machine Intelligence, 1992, pp. 99-106, vol. 14.

Levoy et al., "Light Field Rendering," Proceedings of the 23rd Annual Conference on Computer Graphics and Interactive Techniques—SIGGRAPH '96, 1996, pp. 31-42.

Ng et al., "Light Field Photography with a Hand-held Plenoptic Camera," Informational, 2005, pp. 1-11.

Danehy et al., "A Plenoptic Multi-Color Imaging Pyrometer," 55th AIAA Aerospace Sciences Meeting, 2017, pp. 1-7.

\* cited by examiner

HYPERSPECTRAL PLENOPTIC CAMERA

CROSS-REFERENCE TO RELATED PATENT APPLICATION(S)

This patent application is a continuation-in-part of and therefore claims the benefit of and priority to U.S. patent application Ser. No. 15/634,533, filed on Jun. 27, 2017, which claims priority to U.S. Provisional Application No. 62/356,129, filed on Jun. 29, 2016, the contents of which are hereby incorporated by reference in its entirety.

STATEMENT REGARDING FEDERALLY SPONSORED RESEARCH OR DEVELOPMENT

The invention described herein was made in the performance of work under a NASA contract and by employees of the United States Government and is subject to the provisions of the National Aeronautics and Space Act, Public Law 111-314, § 3 (124 Stat. 3330, 51 U.S.C. Chapter 201), and may be manufactured and used by or for the Government for governmental purposes without the payment of any royalties thereon or therefore.

BACKGROUND

The present disclosure generally relates to imaging devices and more particularly to multi-spectral imaging devices. Consumer off-the-shelf cameras typically include an array of red, green, and blue filters (e.g., Bayer filters) permanently affixed in front of a camera sensor. Such filter arrays may not be suitable for many scientific applications that require imaging of specific wavelengths of light. For example, a Bayer filter array may not transmit the entire spectrum of interest for a given application. As another example, a particular filter segment (e.g., green) in a Bayer filter array may transmit multiple nearby wavelengths, which are required to be imaged separately.

Multi-spectral imaging systems (also referred to as hyperspectral imaging systems) may be used in various applications to simultaneously or sequentially capture images at the specific wavelengths of interest. Some multi-spectral system use beam splitters or other optical elements to direct light of different wavelength to respective greyscale sensors for imaging. These systems are cumbersome, and quickly grow in size as more wavelengths are added. Accordingly, such systems are typically limited to measurements in a single line of sight. Some other multi-spectral imaging systems include filters for different wavelengths on a mechanical disk (called a filter wheel), which is rotated in front in a greyscale sensor to sequentially acquire images at different wavelengths. However, filter-wheel systems present several drawbacks. For example, filter-wheel apparatus are typically bulky and include moving parts, which are subject to failure. Moreover, since the images are taken at different times, data acquisition rate is slowed and imaging of transient events is inhibited.

SUMMARY

Methods, systems, and apparatuses are described for a hyperspectral plenoptic camera. A plenoptic camera may comprise a filter, which may be configured to selectively permit transmission of radiated wavelengths (e.g., light). The filter may be placed in an aperture plane of the plenoptic camera, e.g., between two or more lenses of the plenoptic camera. Placement of the filter in the aperture plane may mitigate undesirable effects (e.g., image shifting) associated with placing the filter in other locations, such as in front of the aperture plane. The filter may transmit discrete frequencies and/or a continuous range of frequencies. One or more lenses and/or irises may be present to further focus, collect, or transmit the wavelengths to a micro lens array. The lenses may be configured to move with respect to one another and/or with respect to a micro lens array and/or an image sensor to focus the wavelengths. The micro lens array may be configured to receive and transmit the filtered wavelengths to an image sensor based on, e.g., an intensity and location of the wavelengths. For example, because the micro lens array may comprise a plurality of lenses in different locations in a camera, the lenses may differently receive and transmit different portions of an image (e.g., different portions of a two-dimensional image, different portions of a wavelength) to the image sensor. The image sensor may receive and process the filtered and focused wavelengths. The image sensor and micro lens array may be contained within, e.g., a camera, such that the aperture plane may comprise the filter and one or more lenses external to a commercially-available camera.

Methods, systems, and apparatuses are also described for deriving quantitative measurements of an imaged material using plenoptic imaging. Imaged material(s) may include solid matter as well as fluidic transparent or semitransparent or other absorptive or emitting matter including, for example, a plume of gas, a flame, or a plasma. Image data may be generated by a plenoptic camera having a filter configured to transmit light with a plurality of different characteristics (e.g., different wavelengths, polarity, and/or angular perspective) in respective regions of the filter. A set of plenoptic image data may be produced by determining respective sets of pixels in the image data corresponding to the different regions of the filter and determining intensities of light with the plurality of different characteristics for respective super-pixel groups of the pixels in the image data. One or more additional quantitative measurements of an imaged material may be derived from a comparison of the determined intensities of light of two or more of the plurality of different characteristics.

An apparatus may be configured to derive quantitative measurements of an imaged material using plenoptic imaging. The apparatus may comprise a first processing circuit configured to receive image data from a plenoptic camera, which may comprise a filter configured to transmit light with a plurality of different characteristics in respective a plurality of different spectra in different regions of the filter. The first processing circuit may be further configured to, in response to receiving the image data, produce a set of plenoptic image data by determining respective sets of pixels in the image data corresponding to the different regions of the filter and determining light intensities of the plurality of different spectra for respective super-pixel groups in the image data. The apparatus may also include a second processing circuit coupled to the first processing circuit. The second processing circuit may be configured to derive one or more additional quantitative measurements of an imaged material from a comparison of the determined intensities of light of two or more of the plurality of different characteristics.

These and other features, advantages, and objects of the disclosed embodiments will be further understood and appreciated by those skilled in the art by reference to the following specification, claims, and appended drawings.

DETAILED DESCRIPTION

Figure 1:
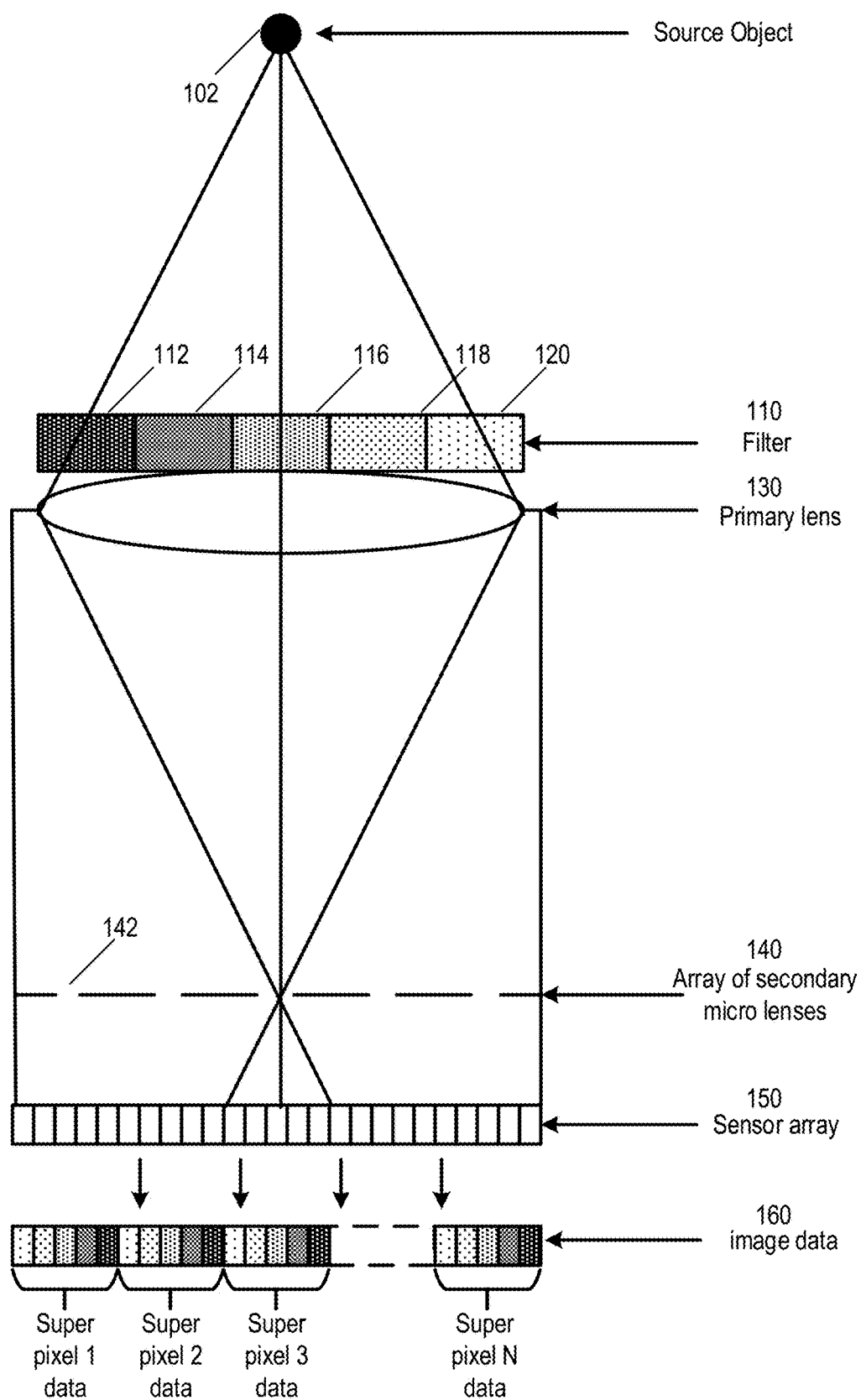
FIG. 1 shows an example plenoptic camera.

For purposes of description herein, the terms "upper," "lower," "right," "left," "rear," "front," "vertical," "horizontal," and derivatives thereof shall relate to orientation shown in FIG. 1. However, it is to be understood that the disclosed embodiments may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

For ease of explanation, the disclosed embodiments are primarily discussed with reference to performing spectral and/or geometric based analysis of plenoptic image data captured by a single plenoptic camera. However, the embodiments are not so limited: some embodiments may perform spectral and/or geometric based analysis on plenoptic image data captured from multiple plenoptic cameras configured as described herein.

FIG. 1 shows an example plenoptic camera. The plenoptic camera includes a filter array 110 having a plurality of different segments 112, 114, 116, 118, and 120. Each segment of the plurality of different segments 112, 114, 116, 118, and 120 is configured to pass a respective wavelength of light. The filter array 110 may also be referred to as a band-pass filter. The segments can be discrete or continuous. For example, each segment may have a uniform transmission bandwidth across the segment with different segments having different, or the same, transmission wavelength. Additionally and/or alternatively, the filter may include an infinite number of segments wherein the transmission wavelength continuously varies across a single large filter. Several such continuously variable filters may be placed in this plane. The filters themselves may be interference filters, absorptive filters, and/or may be made of a transparent solid material (e.g. glass or quartz), gaseous material (e.g. iodine or mercury vapor), polarization selective elements, Fabry-Perot etalons, and/or Fizeau etalons. Neutral density filters can be used to extend the dynamic range of the measurements. Combinations of any of these filters may be used.

Incident light reflected from a source object 102 may be filtered by the filter array 110 and then passes through a primary lens 130 of the camera. Light from the primary lens 130 is focused by an array 140 of secondary lenses 142. The secondary lenses 142 may be implemented with various types of lenses including, for example, pinholes or physical micro-lenses. Each secondary lens in the array may focus a projection of the filtered image (e.g., as filtered by filter array 110) onto a respective group of pixels of a sensor array 150. Each secondary lens of the secondary lenses 142 may form an image of the filter array 110 onto a respective area of the sensor array 150. Light intensity measurements of cumulative pixels in the sensor array 150 may form a set of raw sensor data 160. The respective group of pixels onto which the filter image is projected by a secondary lens of the array (e.g., one of the secondary lenses 142) may be referred to as a super-pixel. Light filtered by each segment of the filter array 110 may be projected onto a respective subset of pixels of each super pixel. Accordingly, each super pixel may measure light intensity of the different wavelengths at a specific position corresponding to the position of the secondary lens. The sensor array 150 may be implemented using various ultraviolet, visible, and/or infrared light sensors for technologies including, but not limited to, charge-coupled device (CCD) sensors and/or complementary metal-oxide semiconductor (CMOS) sensors.

Pixel locations for each of the different wavelengths may be indicated by a pixel map. Using the pixel map, pixel data for each wavelength may be extracted from the raw sensor data 160 to produce a set of plenoptic image data. As described in more detail with reference to FIGS. 2-4, for example, light intensity data for the different wavelengths may be analyzed to derive various quantitative measurements of an imaged material.

Figure 2:
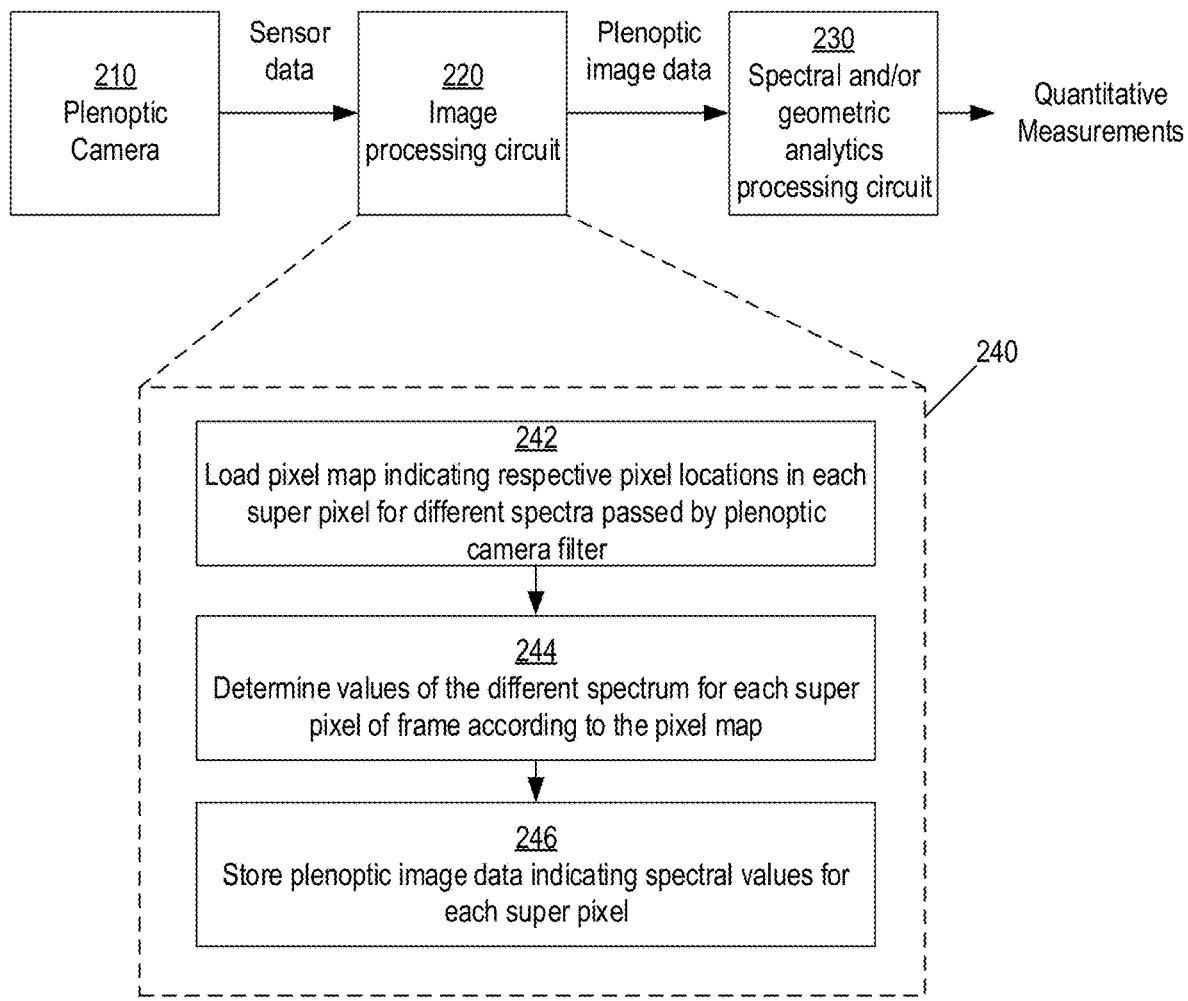
FIG. 2 shows a block diagram of a plenoptic imaging system.

FIG. 2 shows a block diagram of a plenoptic imaging system. A system 200 may include a first processing circuit 220 configured to process sensor data generated by a plenoptic camera 210 to produce a set of plenoptic image data.

The first processing circuit 220 may utilize various processes to generate the plenoptic image data. Block 240 shows a process that may be utilized by the processing circuit 220 to produce the plenoptic image data. At block 242, a pixel map may be loaded. The pixel map may indicate respective pixel locations for each super pixel for different spectra passed by the plenoptic camera filter. At block 244, based on the determined pixel locations, light intensity values may be determined for different spectra of each super pixel. At block 246, plenoptic image data indicating the light intensity values for the different spectra of each super pixel may be stored. The plenoptic image data may be further processed at block 248 to improve image quality. Such processing may include, for example, correction of non-linearity, background subtraction, artifact removal, and/or the like. Various other image processing techniques known in the art may additionally or alternatively be used to improve image quality.

The system 200 also includes an analytics processing circuit 230 which may be configured to perform spectral and/or geometric based analysis of the plenoptic image data to derive one or more quantitative measurements of an imaged material and/or sample. Quantitative measurements of an imaged material and/or sample may include, for example, distance, size, and/or shape measurements, temperature measurements, atomic and/or chemical composition, concentration, density, atomic state, energy level distribution, and/or direction or velocity of motion. Different embodiments may perform various quantitative and/or qualitative measurements using various processes. Some example processes for determining some various measurements are discussed in more detail with reference to FIGS. 3-4.

Figure 3:
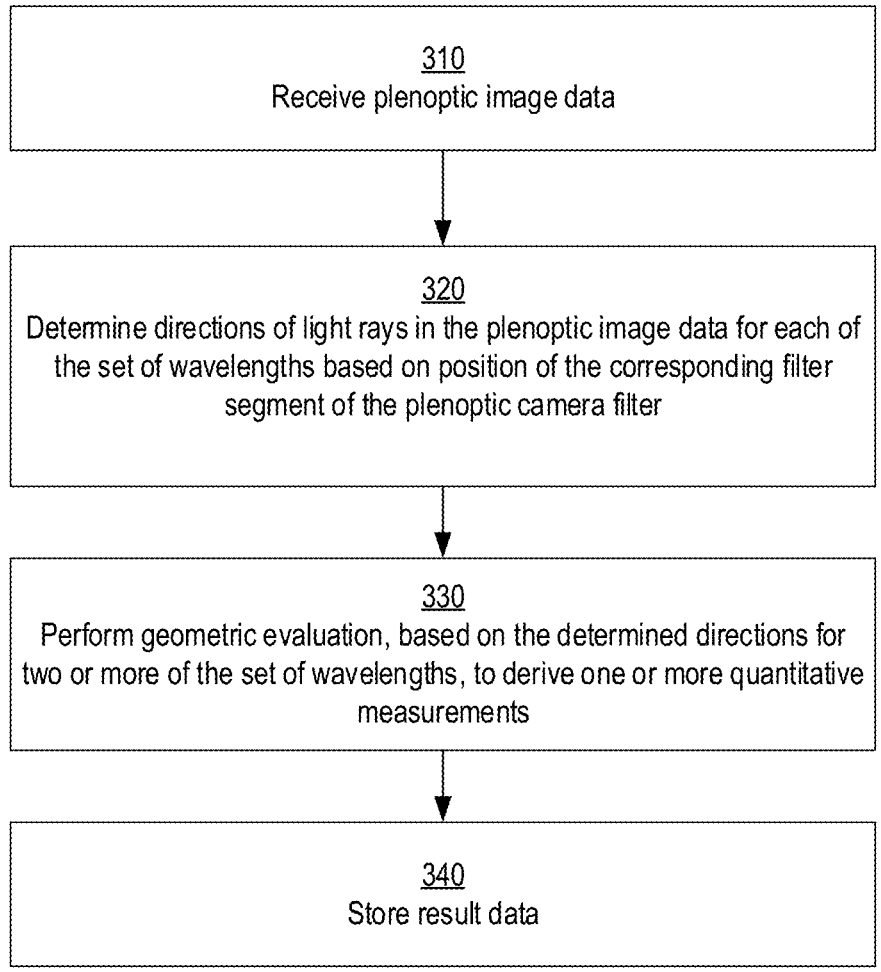
FIG. 3 shows a block diagram of a process for processing plenoptic image data.

FIG. 3 shows a block diagram of a first process for processing plenoptic image data. At block 310, plenoptic image data may be received (e.g., by processing circuit 230 in FIG. 2). At block 320, direction of light rays in the plenoptic image data may be determined for each of the set of wavelengths based on position of the corresponding filter segment of the plenoptic camera filter. At block 330, based on the determined light ray directions for two or more of the set of wavelengths, a geometric evaluation of the plenoptic image data may be performed to derive one or more quantitative measurements of imaged materials.

Parallax calculations may be performed at block 330 using angles of the different light rays to calculate distance to materials depicted at different points in an image. Calculated distances may be used to, for example, reformat the image to as a 3-Dimensional (3D) encoded image. Additionally and/or alternatively, calculated distances from a series of images may be used to plot 3D movement of a materials of interest over time. The geometric analysis performed as block 330 may be used to characterize the size and/or shape of an imaged material. Such characterization may be useful, for example, for tomographic imaging or for constructing 3D models (e.g., computer-aided design models) of real world objects. The geometric analysis performed as block 330 may be used to derive multiple images having different perspectives. An interferometric process may be performed at block 330 to improve resolution of the plenoptic image data. Results from the geometric evaluation performed at block 330 may be stored at block 340.

Figure 4:
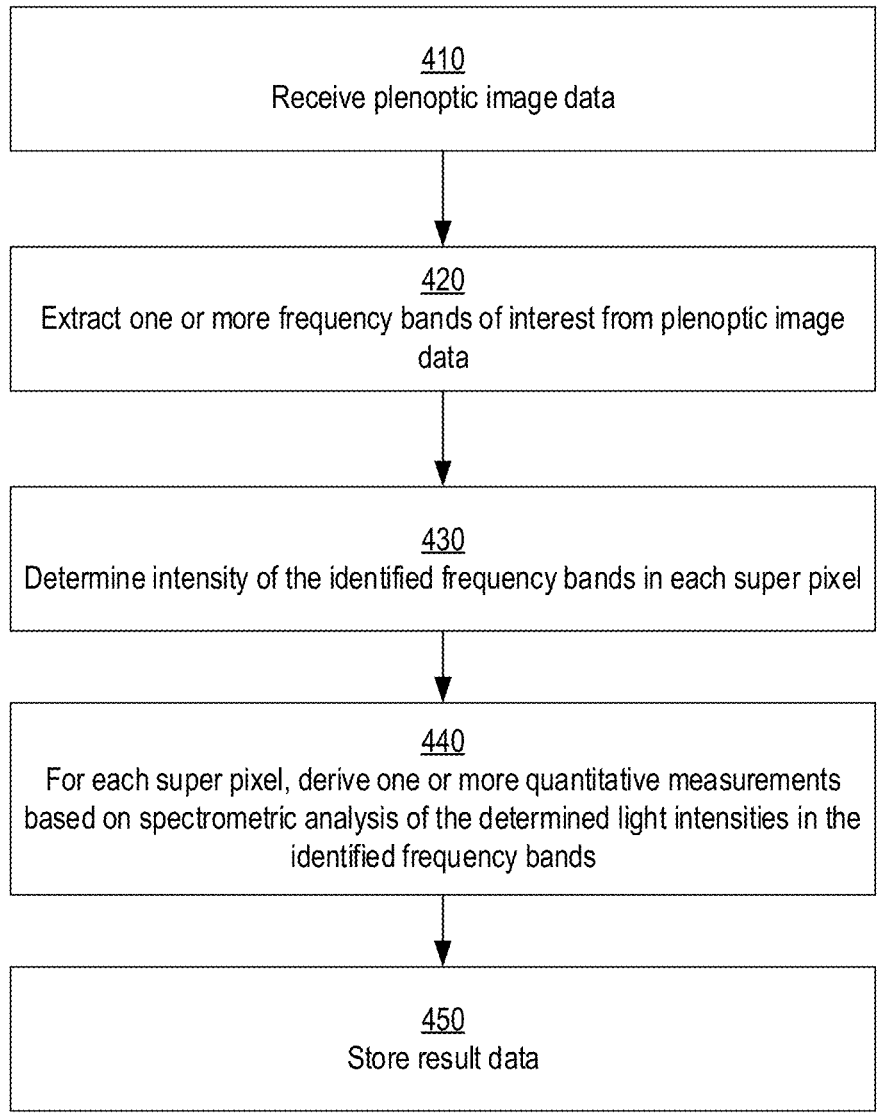
FIG. 4 shows a block diagram of a process for processing plenoptic image data.

Processing of plenoptic image data may comprise a spectroscopic analysis performed to derive various quantitative measurements. FIG. 4 shows a block diagram of a process utilizing spectroscopic analysis for processing plenoptic image data, in accordance with one or more embodiments of the present disclosure. At block 410, plenoptic image data may be received. At block 420, data for one or more wavelengths of interest may be extracted from the plenoptic image data. Intensity of light in the wavelengths of interest for each super pixel may be determined at block 430. At block 440, one or more quantitative measurements may be derived using spectroscopic analysis of the determined intensities of light.

Spectroscopic analysis may comprise use of various spectroscopic techniques alone or in various combinations. Spectroscopic techniques may include, but are not limited to, for example, measurement of blackbody or greybody emissions, fluorescence, laser induced fluorescence, laser-induced breakdown spectroscopy Raman scattering spectroscopy, Rayleigh scattering, absorption spectroscopy, or various combinations thereof. The quantitative measurements derived from the spectroscopic analysis may be stored at block 450. Spectroscopic analysis may be used to derive various quantitative measurements including, for example, temperature, density, composition, movement and velocity of materials, or various combinations thereof.

Spectroscopic analysis of the plenoptic image data may be used to perform two-Dimensional (2D) pyrometric imaging. Pyrometry may comprise use of one or more optical sensors to perform remote temperature measurements of a surface based on light emission and/or absorption by the surface.

Pyrometers may be subject to a variety of undesirable limitations. Measurement performed by many pyrometers may be limited to measurement of temperature at a single point. Plenoptic image data may be evaluated for each imaged super pixel to determine temperature distributions across a 2D image field. Although some cameras (e.g., near-infrared or mid-infrared cameras) may be configured for 2D thermal imaging, such cameras typically determine temperature based on an absolute intensity measurements of a single wavelength. Because such cameras rely on absolute intensity measurements, they can be difficult to calibrate and are susceptible to errors caused by, for example, changes in emissivity, surface finish, composition or phase change, transmission losses, for example through windows, or absorption or emission interferences. Multi-spectral imaging systems may be used for 2D imaging of multiple wavelengths; however, as previously discussed, current multi-spectral imaging systems are generally cumbersome and do not scale well as the number of wavelengths to be measured is increased.

A plenoptic camera may be configured so each super pixel samples multiple wavelengths across the spectrum at each super pixel, thereby allowing 2D imaging of each of the wavelengths. Via spectroscopy analysis of the sampled wavelengths temperature may be determined to produce a 2D thermal image. Various spectroscopic techniques may be utilized, alone or in various combinations, to determine temperature using the wavelength measurements extracted from the plenoptic image data. For example, a blackbody temperature of a material may be determined based on a ratio of light emission of an imaged material at a first wavelength to light emission by the imaged material at a second wavelength. A plenoptic camera may be fitted with a filter configured to isolate a near infrared and green wavelengths (e.g., 800 nm and 550 nm) for respective measurement by respective pixels of each super pixel. A power law curve, indicating temperature as a function of the ratio, may be derived by imaging a material at known temperatures to produce a corresponding set of ratios. The power law curve may thereafter be used to derive temperatures of image materials from the light measurements at the first and second wavelengths.

Although the temperature measurements in the above examples may be determined using measurements of two particular wavelengths, the embodiments are not so limited. Measurements of various other wavelengths may be used to determine temperature. Temperature measurement accuracy may be improved using measurements of three or more wavelengths. For example, ratios of several respective pairs of wavelengths may be used to derive multiple temperature measurements. The temperature measurements may be averaged to determine a more accurate temperature measurement. Additionally and/or alternatively, a curve fitting approach may be used to match the measurements from several wavelengths to theoretical spectra for a given temperature. For example, a plenoptic camera may be configure to measure light intensity at 500, 600, 700, 800, 900, 1000, and/or 1100 nm. Temperature for theoretical curve may be adjusted until it best fits all measured values. Accuracy may additionally and/or alternatively be improved by discarding one or more values that deviate from the best fitting curve A spectroscopic analysis may be performed to determine a composition of materials. A plenoptic camera may be fitted with a series of filters configured to identify atomic and/or chemical compositions of materials of interest (e.g., emissions of cars, industrial factories, supersonic combustors, gas turbine engines, or fundamental combustion studies). Identification of atomic and/or chemical compositions may be based on, for example, emission spectroscopy, absorption spectroscopy, Raman scattering, and/or laser induced fluorescence. For example, atomic species (such as zinc, potassium, magnesium, aluminum, oxygen, hydrogen, helium, lithium, nitrogen, mercury, iron, copper, sodium etc. or diatomic species such as CH, CN, NH, OH, NO, CO, etc., or polyatomic species such as H20, CO2, CH2O, CH4, C2H2, C2H4, C3H8, etc.) or others may be detected based on specific wavelengths of light that are emitted and/or absorbed by imaged gases. Regions of a filter may be configured to isolate individual spectral, lines for particular atoms and/or molecules of interest. For example, a filter may be configured to isolate 656.3 nm and 486.1 nm wavelengths to facilitate measurement of H-alpha and H-beta, respectively. Such Hydrogen lines may be used to facilitate various astrometric measurements including, for example, temperature or relative speed of stars and/or sunspot/flare monitoring of the sun.

Additionally and/or alternatively, Raman scattering or emission spectroscopy or absorption spectroscopy or laser induced fluorescence may be evaluated to assess vibrational and/or rotational characteristics, which may be further indicative of the molecular structure or thermodynamic state of the material or media being studied. Determined atomic/chemical composition data may be used to generate images illustrating 2D distribution of atomic/chemical elements or properties of those elements such as their concentrations or rotational or vibrational temperatures or velocity. Such images may be useful to, for example, detect natural gas leaks in buildings, pipelines, and/or wells. For example, a methane gas leak in a pipeline may be detected using a plenoptic camera may be configured to image a first wavelength, at which intensity is affected by absorption by methane, and image a second wavelength, at which absorption by methane does not affect light intensity. By comparing images of the first and second wavelengths, the methane leak may be detected. The ability of the disclosed plenoptic camera to simultaneously image multiple wavelengths across the spectrum allows a single camera to be used for capture data for multiple different quantitative measurements. For example, in one or more embodiments, a plenoptic camera configured to determine atomic/chemical composition, as described above, may be configured to also measure other wavelengths for determining exhaust temperatures and/or burn efficiencies. Additionally and/or alternatively, in some embodiments, the plenoptic camera may include filters to determine the temperature of a solid material (pipe, smokestack, etc.) emitting the gases.

Figure 5:
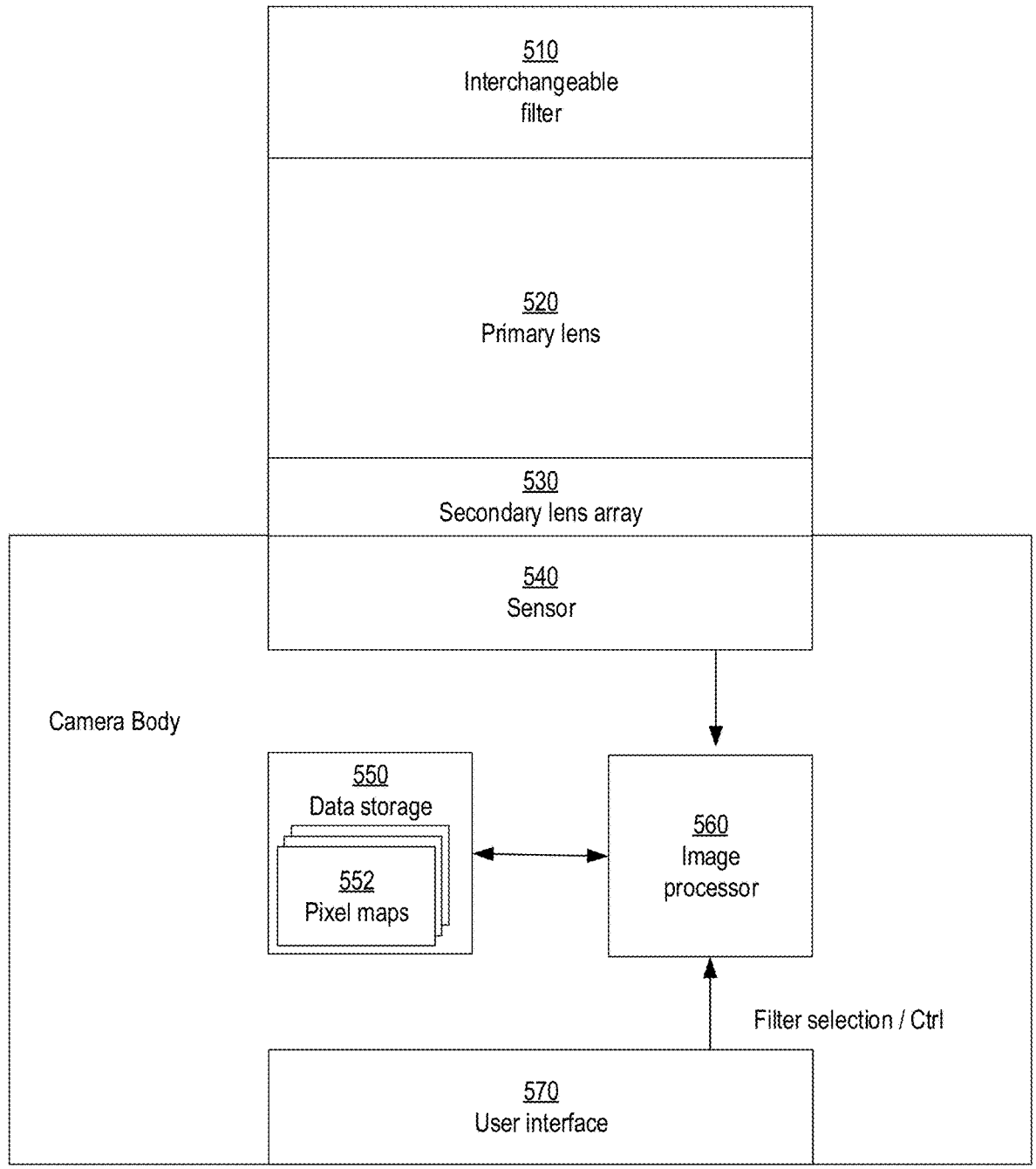
FIG. 5 shows a block diagram of a plenoptic camera that is reconfigurable for use with various different filters.

FIG. 5 shows a block diagram of a plenoptic camera that is reconfigurable for use with various different filters, in accordance with one or more embodiments of the present disclosure. Different applications may require different filters to isolate particular wavelengths of interest. The plenoptic camera shown in FIG. 5 may comprise a filter 510, a primary lens 520, a secondary lens array 530, and a sensor 540, which are configured as described with reference to filter array 110, an array 130, an array 140 of the secondary lenses 142, and a sensor array 150 in FIG. 1. An interface (not shown) between the filter 510 and primary lens 520 may be configured to allow the filter 510 to be removed and replaced by a different filter adapted for a different application. The camera further includes a data storage 550, an image processor 560, and a user interface contained in a camera body along with the sensor 540. The data storage includes respective pixel maps for processing plenoptic data that may be captured using different filters (e.g., the filter 510). The image processor 560 may be configured to process data captured by sensor 540 according to one of the pixel maps 552, corresponding to the filter 510, to produce a set of plenoptic image data. A user may use a user interface 570 to specify which filter 510 is currently attached. Based on the specified filter, the processor may locate and retrieve the corresponding pixel map 552 to process data from the sensor 540. Additionally and/or alternatively, the image process may be configured to automatically determine which filter is attached. For example, the filter may include a non-volatile memory storing a data (e.g., a binary number) that uniquely identifies each type of filter.

Figure 6:
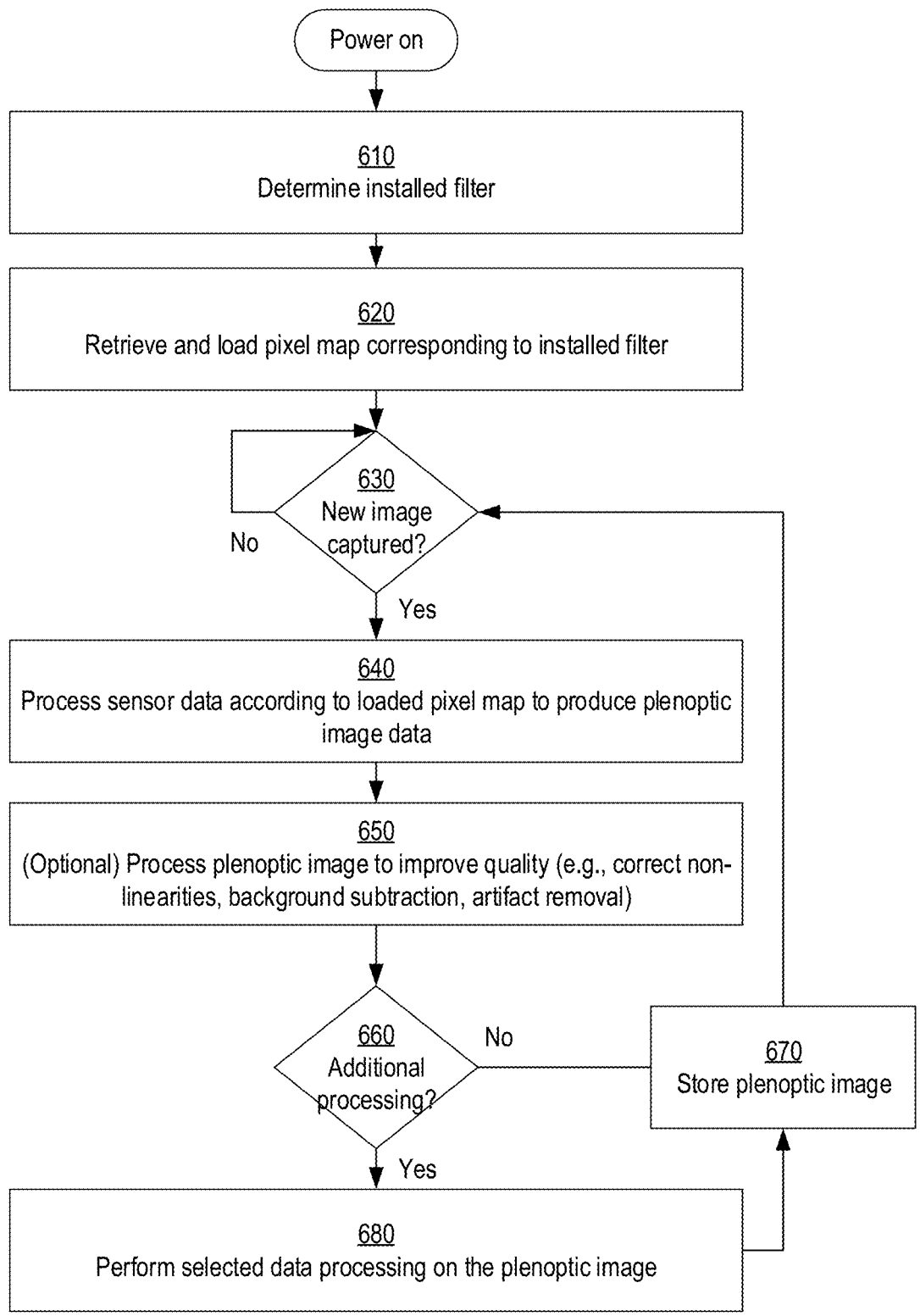
FIG. 6 shows a block diagram of a process for processing a reconfigurable plenoptic camera.

FIG. 6 shows a block diagram of an example process for processing a reconfigurable plenoptic camera. At block 610, a processing circuit may determine the filter that is installed in the plenoptic camera. At block 620, the processing circuit may retrieve and load a pixel map corresponding to the filter determined to be installed. At decision branch 630, it is determined whether a new image was captured and, if so, the flow chart may proceed to block 640. At block 640, sensor data may processed according to the loaded pixel map to produce a plenoptic image data. Optionally, at block 650, the plenoptic image data may be processed to improve image quality as discussed with reference to FIG. 2 (e.g., using non-linearity correction, background subtraction, and/or artifact removal).

The plenoptic image data may be processed in real time to derive various quantitative and/or qualitative measurements. The plenoptic image data may be stored for further processing at a later time. If additional processing is selected at decision branch 660 (e.g., to derive various quantitative measurements), the selected processing is performed at block 680. Otherwise, if no addition processing is selected, and/or following block 680, the plenoptic image may be stored at block 670. The process may then return to decision branch 630 and wait for capture of the next image.

Figure 7:
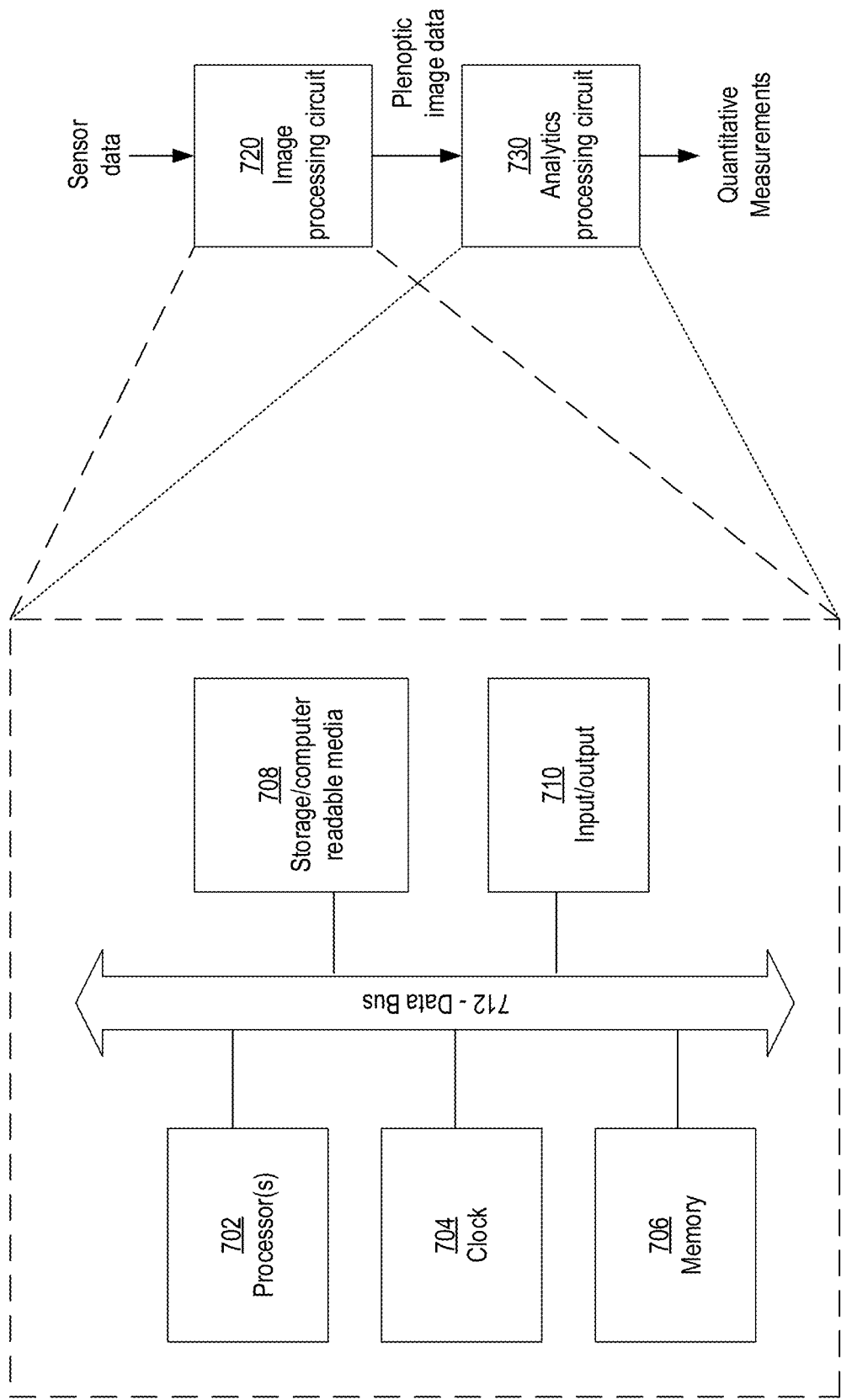
FIG. 7 shows a computing device that may be used to process sensor data and/or plenoptic image data.

FIG. 7 shows a computing device 700 that may be used to process sensor data and/or plenoptic image data. The computing device 700 may be configured to execute a process 720 for producing a set of plenoptic image data from sensor data. Such a process may be the same or similar as described with reference to processing circuit 220 in FIG. 2. The computing device 700 additionally and/or alternatively execute a process 730 that may perform spectral and/or geometric based analysis of the plenoptic image data as, for example, described with reference to processing circuit 230. The computing device 700 may be configured to implement one or more of the processes 720 and 730 individually or in various combinations. Where the processor 702 is configured to implement multiple ones of the processes, the respective processes may be performed by separate sub-circuits within the processing circuit (e.g., separate cores), or by one or more shared circuits within the processing circuit (e.g., via scheduling management of multiple threads).

Various alternative computing devices, including one or more processors and a memory arrangement configured with program code, may be suitable for hosting the processes and implementing the algorithms of the different embodiments. The computer code, comprising the processes of one or more embodiments encoded in a processor executable format, may be stored and provided via a variety of computerreadable storage media and/or delivery channels such as magnetic or optical disks or tapes, electronic storage devices, or as application services over a network.

The computing device 700 may comprise one or more processors 702, a clock signal generator 704, memory 706, storage 708, and an input/output control unit 710 coupled to a host bus 712. The computing device 700 may be implemented with separate components on a circuit board or may be implemented internally within an integrated circuit. When implemented internally within an integrated circuit, the processor computing device may be referred to as a microcontroller.

The architecture of the computing device may depend on implementation requirements as would be recognized by those skilled in the art. The processor 702 may be one or more general purpose processors, or a combination of one or more general purpose processors and suitable co-processors, or one or more specialized processors (e.g., RISC, CISC, pipelined, etc.).

The memory 706 may comprise multiple levels of cache memory and a main memory. The storage 708 may comprise local and/or remote persistent storage, such as provided by magnetic disks (not shown), flash, EPROM, or other non-volatile data storage. The storage unit may be read or read/write capable. Further, the memory 706 and storage 708 may be combined in a single arrangement.

The processor 702 executes the software in storage 708 and/or memory 706 units, reads data from and stores data to the storage 708 and/or memory 706 units, and communicates with external devices through the input/output control unit 710. These functions may be synchronized by the clock signal generator 704. The resource of the computing device may be managed by either an operating system (not shown), or a hardware control unit (not shown).

Figure 8:
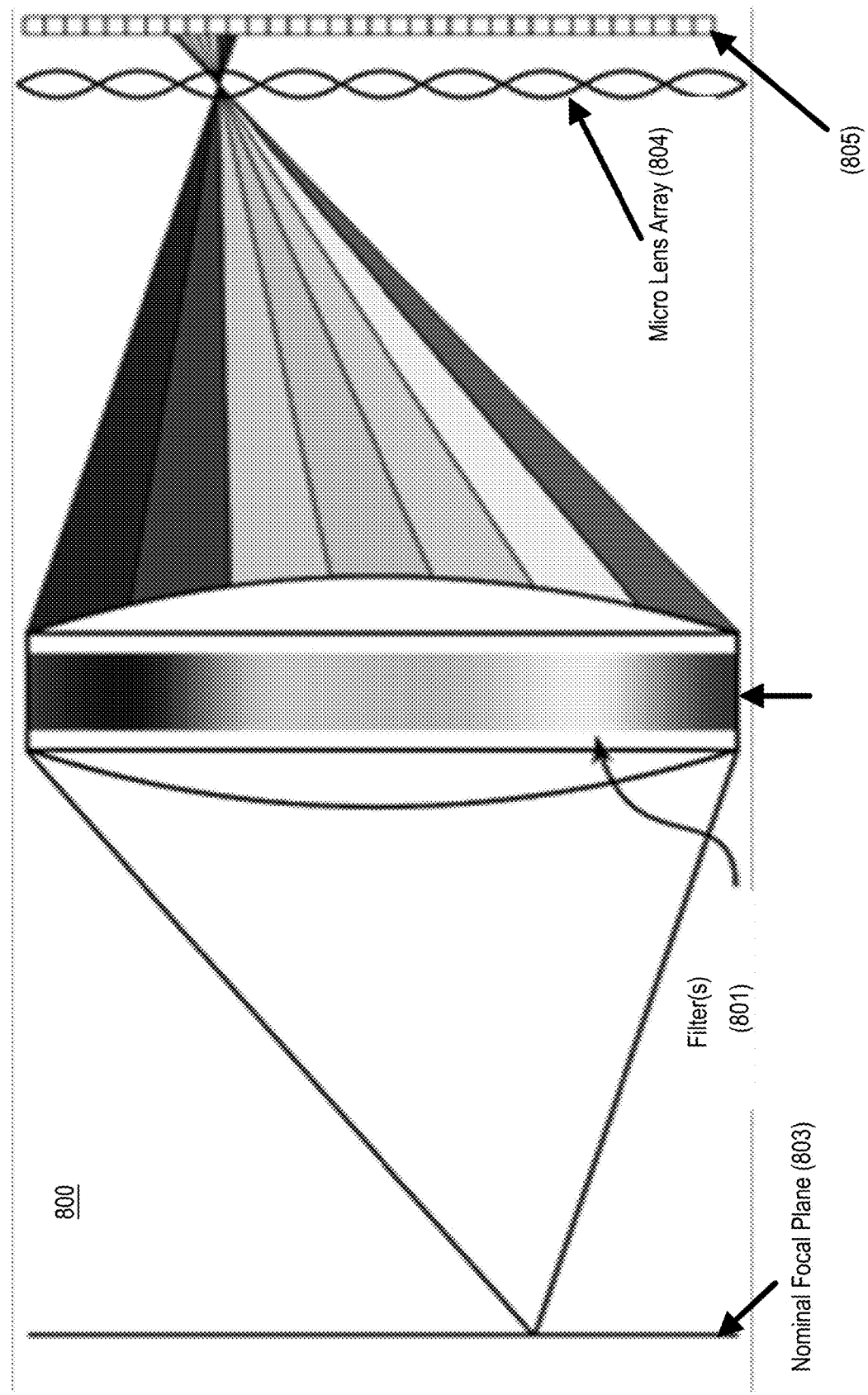
FIG. 8 shows a plenoptic camera with filters located at an aperture plane.

FIG. 8 shows a plenoptic camera 800 with filters 801 located at an aperture plane 802. The plenoptic camera may be configured to receive radiation (e.g., light) from a nominal focal plane 803, filter such radiation at the aperture plane 802 using filters 801, and focus (e.g., using one or more lenses, not shown) such filtered radiation, via a micro lens array 804, onto sensors 805. The filters 801 may be any form of frequency discriminator, and may be the same or similar as the filter array 110. For example, the filters 801 may filter light at discrete frequencies, and/or may filter a continuous range of frequencies. The filters 801 may be placed between two or more lenses, such that the filters 801 remain in the aperture plane 802. The plenoptic camera shown in FIG. 8 may be the same or similar to that depicted in FIG. 1; however, as shown in FIG. 8, the filters 801 are located at the aperture plane 802, whereas, in FIG. 1, the filter array 110 is shown before the primary lens 130. Other plenoptic cameras, not shown, may place similar filters on top of the image sensor (e.g., at the sensor array 150).

Placement of the filters 801 at the aperture plane 802, as shown in FIG. 8, has numerous quality advantages with respect to images captured by the sensors 805. Placement of the filters 801 at the aperture plane 802 may beneficially reduce drifting of sub-images as captured by micro lenses (e.g., the array 140 of secondary micro lenses 142, and/or the micro lens array 804). For example, if the filters 801 were located outside of the aperture plane 802 (e.g., towards the nominal focal plane 803 and outside of the aperture plane 802), the additional distance may cause the radiation received from the micro lens array 804 to shift based on location, meaning that sub-images captured by different micro lenses of the micro lenses 804 may not properly correspond to one another. Additionally or alternatively, in some embodiments, placement of the filters 801 at the aperture plane 802 may substantially reduce the overall size (e.g., length) of the plenoptic camera 800.

Figure 9:
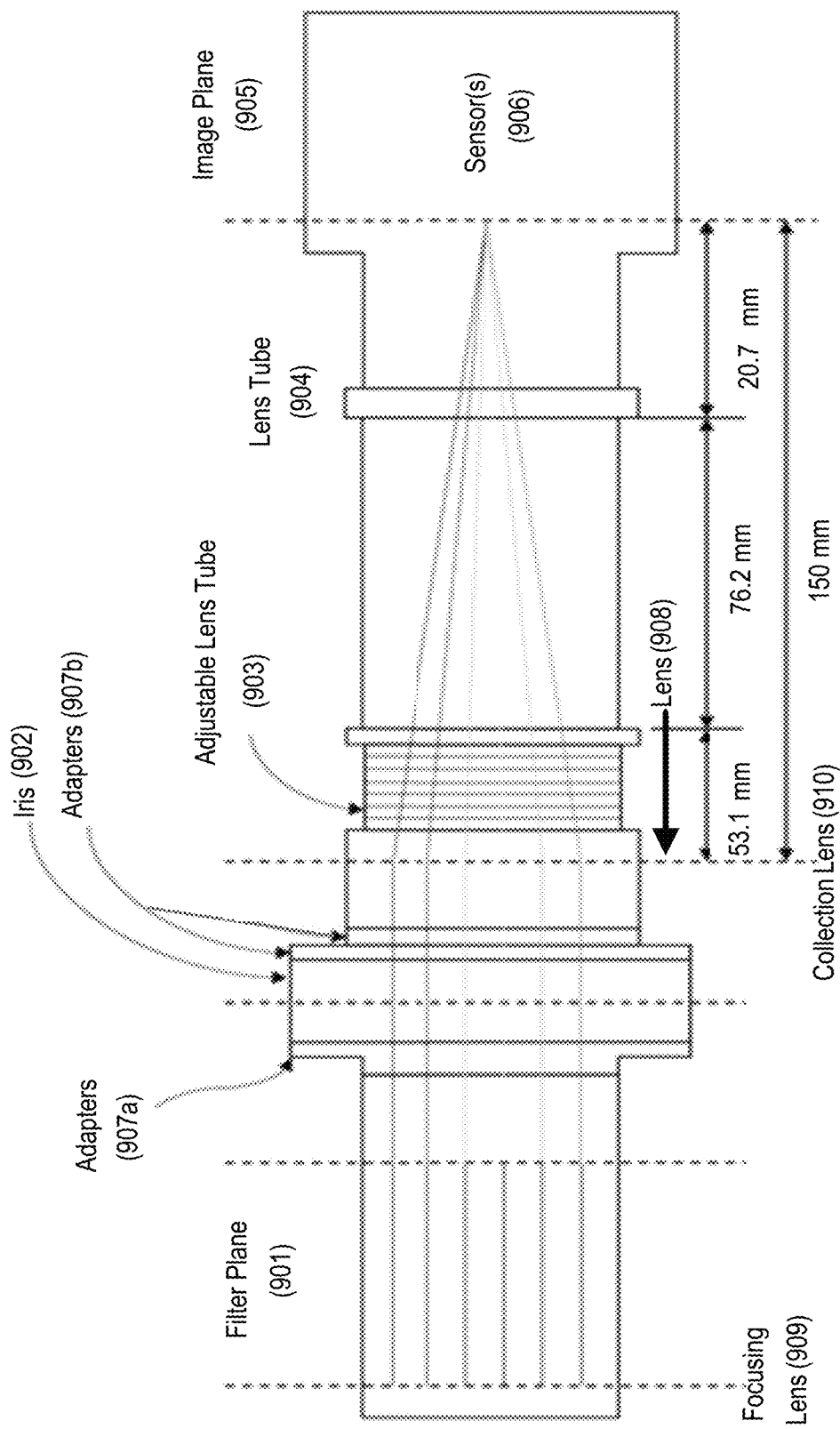
FIG. 9 shows a plenoptic camera comprising a plurality of lenses and with filters located at an aperture plane.

FIG. 9 shows a plenoptic camera 900 implemented using the configuration shown in FIG. 8 and using a variety of lenses. Radiation (e.g., light) travels through a filter plane 901, an iris 902, and lenses held by an adjustable lens tube 903 and a lens tube 904 to an image plane 905, where the image is captured by sensors 906. The adjustable lens tube 903 and lens tube 904 may be configured to hold one or more lenses, such as the lens 908 located at an end of the adjustable lens tube 903. Other lenses may be present, such as a focusing lens 909, and a collection lens 910, which focus light into and collect light from filter(s) in the filter plane 901, respectively. The iris may be configured to calibrate the quantity of radiation allowed to pass on to the collection lens 910. Adapters 907*a*-*b* may be configured to, e.g., connect the iris 902 with the adjustable lens tube 903 and the filter plane 901. The sensors 906 may be the same or similar as the sensors 805 and/or the sensor array 150. A micro lens array, not shown, may be implemented in or near the sensors 906. For example, the sensors 906 may comprise a camera with a micro lens array contained therein.

The filter plane 901 may be configured with one or more filters, such as the filters 801 and/or the filter array 110, for example. The filter plane 901 may correspond with a region where radiation (e.g., light) is collimated. Collimation of the radiation between lenses ensures that a filter in the filter plane is also within the aperture plane. The adjustable lens tube 903 and the lens tube 904 may be configured to move with respect to one another to focus light via the iris 902 onto the sensors 906. As an illustrative example, as shown in FIG. 9, the adjustable lens tube 903 has a length of 53.1 mm from the beginning of the adjustable lens tube 903 to the end of the adjustable lens tube 903, a first portion of the lens tube 904 is 76.2 mm, and a second portion of the lens tube 904 is 20.7 mm, such that the entire length is 150 mm. Different implementations may utilize other dimensions to provide other focal lengths. The adjustable lens tube 903 may be adjusted to lengthen or shorten such distance if desired. This may advantageously allow for the precise selection and customization of main lens focal length.

The configuration of the plenoptic camera 900 shown in FIG. 9 allows for ready mathematical determination of the size of a sub-aperture image. The plenoptic camera 900 may be configured using the equation $$d_s = \frac{d_a f_\mu}{l_i}$$

In this equation, $d_s$ is the sub-aperture image diameter, $d_a$ is the aperture diameter, $f_\mu$ is the micro lens focal length, and $l_i$ is the image distance.

The sensors 906 may be the same as or similar to the sensor 540 and may perform any of the steps described with respects to FIGS. 2-7. For example, the sensors 906 may be calibrated based on the relative distances of lens in the plenoptic camera 900. As another example, the sensors 906 may be calibrated based on a linearity of the plenoptic camera 900 and/or a global intensity scaling.

Figure 10:
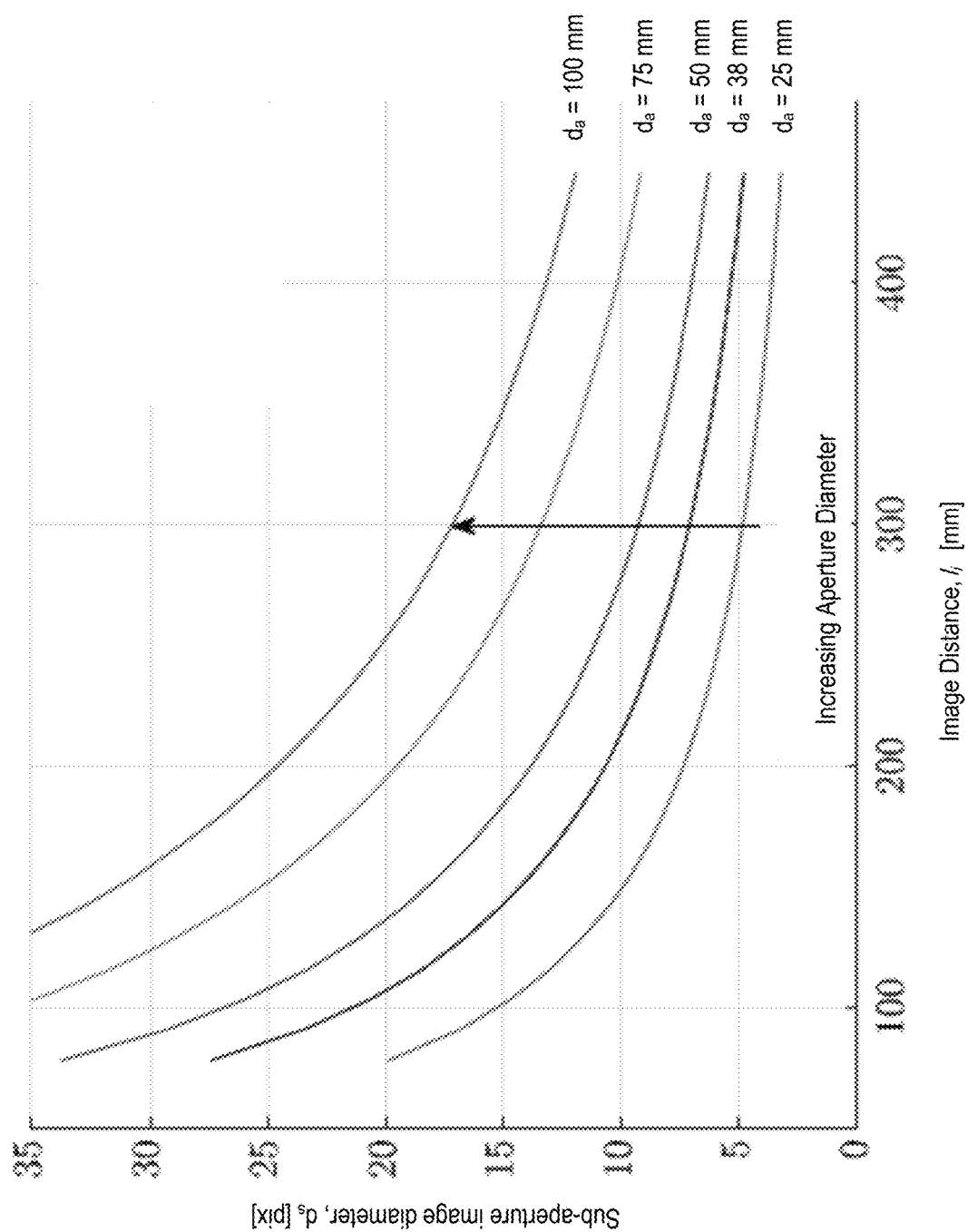
FIG. 10 depicts design rules for a plurality of aperture diameters for a plenoptic camera.

FIG. 10 shows design rules for aperture diameters which may be applicable to the design of the plenoptic camera 900. Specifically, FIG. 10 reflects the relationship between sub-aperture image diameter and image distance across a plurality of different focal lengths.

Figure 11:
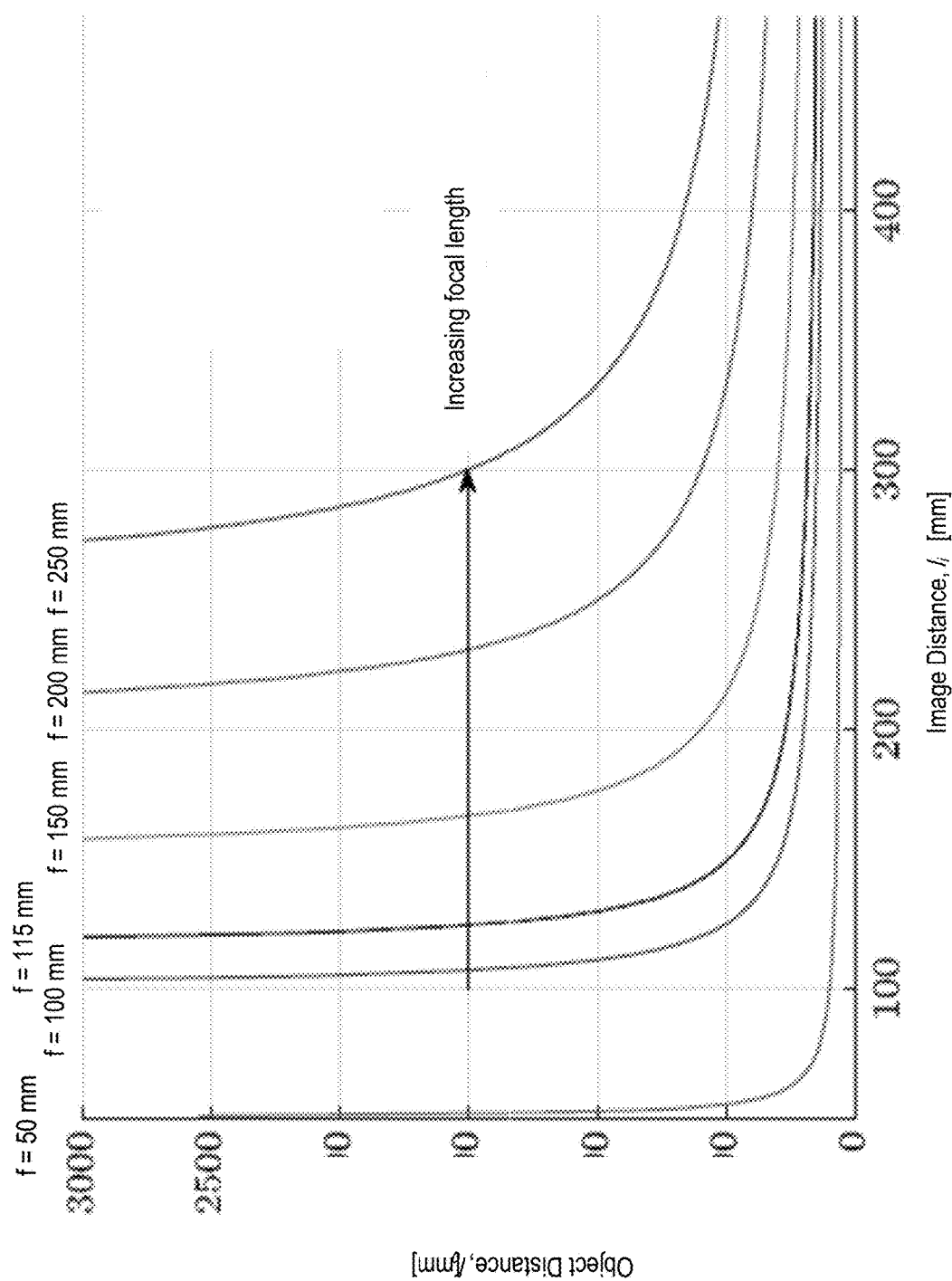
FIG. 11 shows a graph depicting the relationship between object distance and image distance across a plurality of different focal lengths.

FIG. 11 shows design rules for focal length and object distance which may be applicable to the design of the plenoptic camera 900. Specifically, FIG. 11 reflects the relationship between object distance and image distance across a plurality of different focal lengths.

Figure 12:
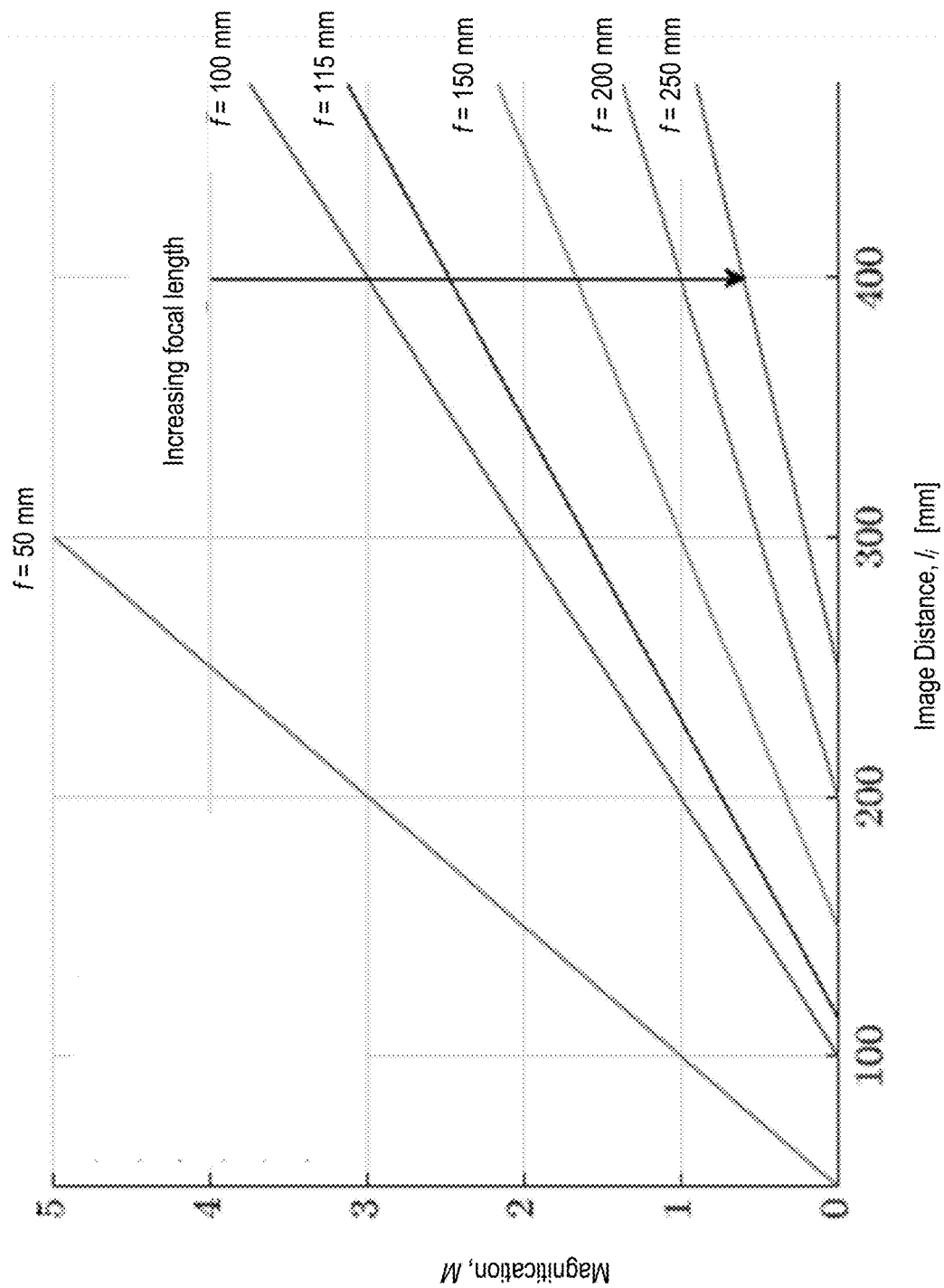
FIG. 12 shows a graph depicting the relationship between magnification and image distance across a plurality of different focal lengths.

FIG. 12 shows design rules for focal length and magnification which may be applicable to the design of the plenoptic camera 900. Specifically, FIG. 12 reflects the relationship between magnification and image distance across a plurality of different focal lengths.

It will be readily understood that the components of various embodiments of the present disclosure, as generally described and, illustrated in the figures herein, may be arranged and designed in a wide variety of different configurations. Thus, the detailed description of the embodiments of the present disclosure, as represented in the attached figures, is not intended to limit the scope of the invention as claimed, but is merely representative of selected embodiments of the invention.

The features, structures, or characteristics of the present disclosure may be combined in any suitable manner in one or more embodiments. For example, reference throughout this specification to "certain embodiments," "some embodiments," or similar language means that a particular feature, structure, or characteristic described in connection with the embodiment is included in at least one embodiment. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

Other aspects and embodiments may will be apparent from consideration of the specification. It is intended that the specification and illustrated embodiments be considered as examples only with a true scope of the invention being indicated by the following-claims

What is claimed is:

1. A plenoptic camera, comprising:
a filter located between a first lens and a second lens in an aperture plane of the plenoptic camera, wherein the filter is configured to selectively permit transmission of wavelengths;
a micro lens array, wherein each micro lens of the micro lens array is configured to, based on a location of the wavelengths, focus the wavelengths from the filter; wherein a distance between the micro lens array and the second lens is based on a diameter of an aperture of the plenoptic camera; and
an image sensor, configured to receive the focused wavelengths.

2. The plenoptic camera of claim 1, wherein one of the two lenses is configured to be adjusted with respect to the image sensor.

3. The plenoptic camera of claim 1, wherein the filter is configured to selectively transmit a continuous range of wavelengths.

4. The plenoptic camera of claim 1, further comprising: an iris, configured to focus the wavelengths relative to the image sensor.

5. The plenoptic camera of claim 1, wherein the filter is located in the aperture plane of the plenoptic camera such that a center of the filter is imaged by a center of a first micro lens of the micro lens array.

6. A method comprising:
receiving, via an aperture of a plenoptic camera, wavelengths;
filtering, using a filter located between a first lens and a second lens located in an aperture plane of the plenoptic camera, the wavelengths, wherein the filtering comprises selectively permitting transmission of the wavelengths;
focusing, via a micro lens array and based on a location of the wavelengths, the wavelengths onto a sensor, wherein a distance between the micro lens array and the second lens is based on a diameter of an aperture of the plenoptic camera; and
outputting, by the plenoptic camera and using an image sensor, an indication of the location and intensity of the wavelengths.

7. The method of claim 6, wherein one of the two lenses is configured to be adjusted with respect to the image sensor.

8. The method of claim 6, wherein the filter is configured to selectively transmit a continuous range of wavelengths.

9. The method of claim 6, further comprising:
focusing, using an iris of the plenoptic camera and based on a location of the image sensor, the wavelengths.

10. The method of claim 6, wherein the filter is located in the aperture plane of the plenoptic camera such that a center of the filter is imaged by a center of a first micro lens of the micro lens array.

11. A system comprising:
a filter located between a first lens and a second lens in an aperture plane of a plenoptic camera, and
a sensor region of the plenoptic camera;
wherein the filter is configured to:
receive, via an aperture, wavelengths; and
filter the wavelengths by selectively transmitting a first set of the wavelengths to the sensor region; and
wherein the sensor region is configured to:
receive the first set of the wavelengths; and
focus, using a micro lens array and based on a location of the wavelengths, the wavelengths onto an image sensor, wherein a distance between the micro lens array and the second lens is based on a diameter of an aperture of the plenoptic camera.

12. The system of claim 11, wherein one of the two lenses is configured to be adjusted with respect to the image sensor.

13. The system of claim 11, wherein the filter is configured to selectively transmit a continuous range of wavelengths.

14. The system of claim 11, further comprising:
an iris, configured to focus the wavelengths relative to the image sensor.

* * * * *

UNITED STATES PATENT AND TRADEMARK OFFICE
CERTIFICATE OF CORRECTION

PATENT NO. : 11,115,573 B2
APPLICATION NO. : 16/413231
DATED : September 7, 2021
INVENTOR(S) : Timothy W. Fahringer et al.

It is certified that error appears in the above-identified patent and that said Letters Patent is hereby corrected as shown below:

On the Title Page

Item (73) Assignee: at Column 1, Lines 1, 2, 3 and 4:
Replace Assignee "United States of America as Represented by the Administrator of NASA" with
--United States of America as Represented by the Administrator of NASA Washington, DC (US) and
Auburn University, Office of Innovation Advancement and Commercialization, Auburn, AL (US)--

Signed and Sealed this
Third Day of May, 2022

Katherine Kelly Vidal
*Director of the United States Patent and Trademark Office*